United States Patent [19]

Flickinger

[11] Patent Number: 5,375,401

[45] Date of Patent: Dec. 27, 1994

[54] EASY WEED AND DANDELION REMOVER

[76] Inventor: Harry H. Flickinger, 8730 Lochaven Dr., Gaithersburg, Md. 20879

[21] Appl. No.: 59,106

[22] Filed: Jun. 25, 1993

[51] Int. Cl.$^5$ .............................................. A01D 1/00
[52] U.S. Cl. ........................................ 56/239; 56/333; 244/50.9; 7/114; 30/134
[58] Field of Search ................. 56/239, 333, 335, 243; 294/50.9, 50.6, 60, 19.1; 7/114; 30/134, 135, 188, 190

[56] References Cited

U.S. PATENT DOCUMENTS 2,373,872  4/1945  Couture ............................. 294/50.9
3,990,146  11/1976  Asselta ........................... 294/50.9 X
4,157,198  6/1979  McDaniels ........................ 294/50.9

FOREIGN PATENT DOCUMENTS 19325  9/1904  United Kingdom ............... 294/50.9

Primary Examiner—Terry Lee Melius

[57] ABSTRACT

A lawn and garden tool for removing weeds and dandelions includes a cutting blade fixedly secured to the distal end of a shaft and a pivotable claw arranged to have its serrated edge pivotably closed against a flat surface of the blade, The claw has two spaced pivot arms secured to opposite sides of the shaft to evenly distribute the closure force, A linkage rod is actuable by a trigger grip secured at the proximal end of the shaft to permit selective closure of the claw in opposition to a bias force exerted by a compression spring disposed for protection in a recess defined in the pistol grip handle.

15 Claims, 1 Drawing Sheet

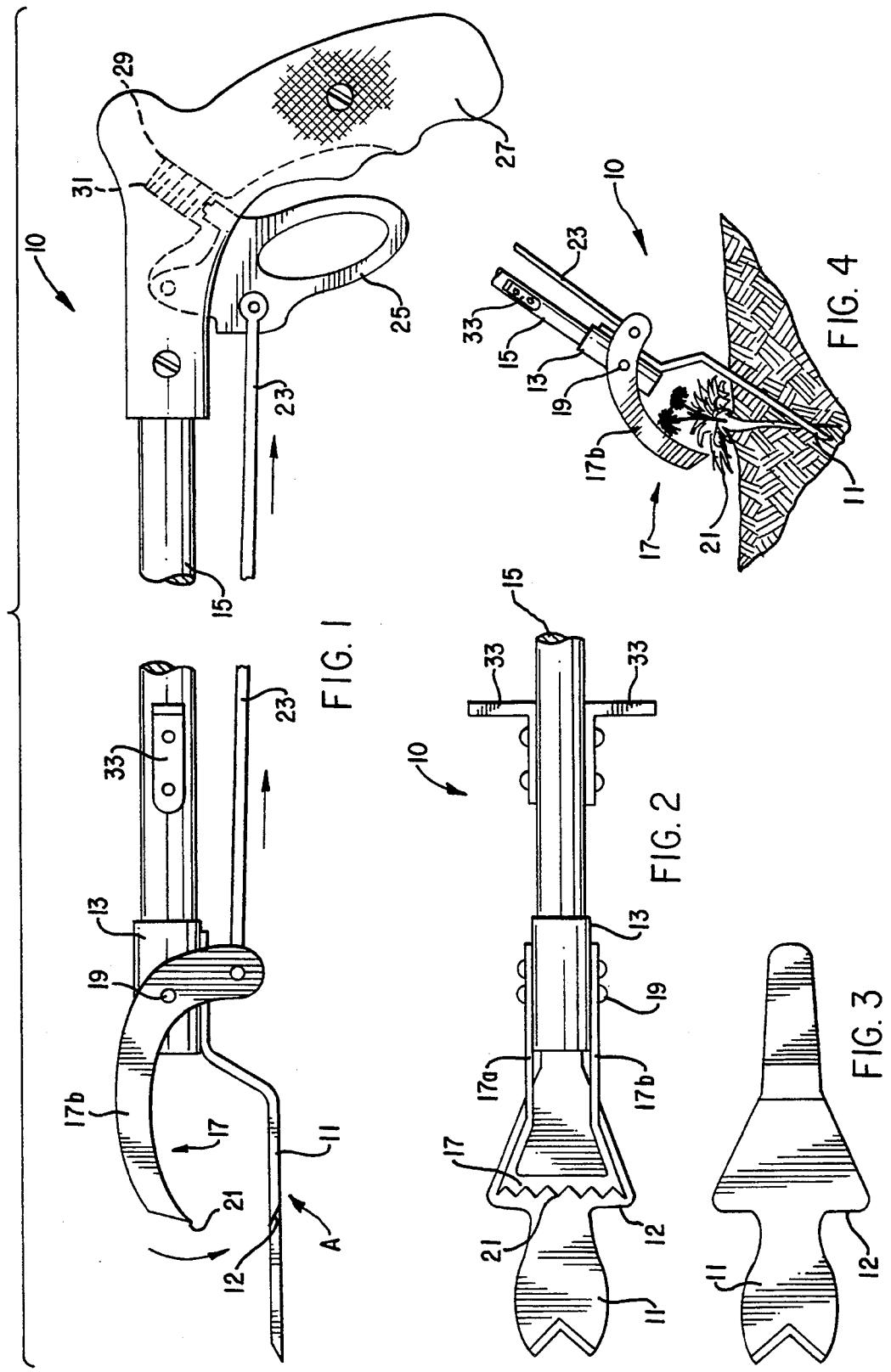

EASY WEED AND DANDELION REMOVER

BACKGROUND OF THE INVENTION

The present invention relates to lawn and garden tools and, more particularly, to an improved weed and dandelion remover.

SUMMARY OF THE INVENTION

The weed and dandelion remover of the present invention includes a fixed cutting blade and a pivotable claw interactively mounted at the distal end of a support shaft. The claw has parallel spaced pivot arms disposed on opposite sides of the shaft, and a serrated forward edge arranged to move toward and away from a surface of the blade as the claw pivots. A trigger grip at the proximal end of the shaft is connected by a linkage rod to the claw to permit selective closing of the claw against the blade. A bias spring, protectably recessed in the grip, biases the linkage rod to urge the claw to its open position.

BRIEF DESCRIPTION OF THE DRAWINGS

FIG. 1 is a broken side view in elevation of the preferred embodiment of the weed and dandelion remover of the present invention.

FIG. 2 is a top view in plan of the distal end of the weed and dandelion remover of FIG. 1.

FIG. 3 is a top view in plan of the blade unit used in the embodiment of FIG. 1.

FIG. 4 is a side view in elevation of the distal end of the embodiment of FIG. 1 shown in the process of removing a weed.

DESCRIPTION OF THE PREFERRED EMBODIMENT

The weed and dandelion remover 10 of the present invention includes a fixed metal blade 11 with a particular configuration which is welded to a metal cap 13 fitted to the distal end of a wooden or metal shaft 15 approximately three feet in length. There is a movable metal prong or claw 17 attached to the same end of the shaft as the fixed blade. The movable claw 17 is attached by a bolt 19 inserted through the metal cap 13 to which the fixed blade is also attached. The bolt 19 holding movable claw 17 is also the pivot point for the claw. Movable claw 17 has a serrated-like edge 21 which rotates toward fixed blade 11 and closes on the fixed blade. This rotating and closing action is controlled by a metal linkage rod 23 connected to the rearward end of the movable claw 17. Rod 23 extends parallel to and along the length of shaft 15 and is connected to a trigger mechanism 25 at the proximal end of the shaft. The trigger mechanism is rotatably secured to a handle 27 adapted to be gripped by the operator. Handle 27 contains a cylindrical recess 29 enclosing a spring 31 that maintains constant bias pressure or force on trigger 25, tending to extend rod 23 distally and, in turn, holding the movable claw in the "open" position. There are metal foot bars 33 located on each side of the shaft toward the distal end of the shaft, i.e., toward the end with the fixed blade 11 and movable claw 17.

To operate the weed and dandelion remover 10, the operator inserts blade 11 at an angle under the plant to be removed as illustrated in FIG. 4. The blade is inserted deep enough to sever the main root or roots with the sharp distal end of the blade. The insertion of the blade can normally be done by the use of the hand only—with a pushing motion while gripping handle 27. In those instances where the root is unusually large or stubborn or the soil is unusually hard, the operator can facilitate insertion of the blade by simply applying force with a foot pressed to a foot bar 33.

When blade 11 has been inserted under the plant to the point where the widened part 12 of the blade is slightly lower than ground level, the operator pulls or squeezes the trigger 25. Pulling the trigger rotates claw 17 toward the fixed blade 11. When claw 17 is firmly pressed against the plant disposed between the claw and the fixed blade positioned under the plant, the operator then extracts the plant from the ground. By releasing trigger 25, the plant can be readily discarded.

The wooden or metal shaft 15 is typically less than one inch in diameter and approximately three feet in length, and is the support structure upon which all other components of the weed and dandelion remover 10 are either directly or indirectly attached. The utilization of the shaft is essential to achieving remote operability.

Fixed metal blade 11 and movable metal claw 17 are attached to the distal end of the shaft and operate in concert to produce the desired result. The fixed metal blade is typically made of sturdy material (e.g., one eighth inch steel) and the movable claw is preferably made of aluminum (e.g., 61 Grade). Fixed blade 11 is securely affixed to the distal end of shaft 15 by means of metal cap 13 to which the blade is welded. The movable claw is attached to the shaft by means of bolt 19 inserted through metal cap 13 and two spaced parallel arms 17a and 17b of the claw disposed on opposite sides of the shaft. Bolt 19 serves as the fulcrum for spaced arms 17a and 17b of movable claw 17 which is designed to rotate with a radius of approximately four inches from the bolt to the end of the claw. Serrated edge 21 is positioned to rotate toward fixed blade 11.

Fixed blade 11, which extends approximately six inches beyond the end of the shaft, is configured to produce the above-described result when used in conjunction with the movable claw. Specifically, blade 11 is widened at the point 12, where the serrated edge 21 of the rotated claw closes on the surface of the fixed blade. The serrated edge 21 of the movable claw and the corresponding surface area of fixed blade 11 are typically two and three quarter inches in width. This increased width, relative to the width of the remaining parts of the blade and claw, increases the tactile surface at the gripping interface between serrated edge 21 and fixed blade 11.

Metal linkage rod 23 is connected to the rearward end of movable claw 17 (i.e., opposite the forward end with the serrated edge). Linkage rod 23 extends parallel along the length of shaft 15, and connects to trigger mechanism 25 housed in a handle at the proximal end of shaft 15. The trigger mechanism is a simple spring loaded loop design into which three or four fingers can be inserted and can be made of either metal or plastic. Bias spring 31 is disposed in recess 29 where it is protected from impact, dirt and the elements.

It is the combination of the essential elements set out above, i.e., the shaft, the fixed blade and movable claw with dual pivot arms, the linkage rod and remote trigger mechanism with protectably recessed bias spring, which distinguishes this invention from other devices intended to achieve the same effect. The use of the rotating movable claw with a pair of spaced pivot arms, in particular, represents a significant difference from devices previously designed. It is the utilization of the rotating movable claw, through means of the remote trigger with a protected spring, which fixes the essential limit of this claim.

I have invented a weed and dandelion remover designed to remove such plants from lawns and gardens with ease. The weed and dandelion remover can be operated with one hand the with the operator standing. In addition to average individuals, senior citizens and others with physical limitations can operate this device without excessive exertion or complex motion.

I claim:

1. A lawn and garden tool for removing weeds and dandelions, said tool comprising:

a support shaft having proximal and distal ends;

a cutting blade fixedly mounted on the distal end of said shaft, said cutting blade having a sharpened forward edge for penetrating soil and severing roots of dandelions and weeds to be removed, said blade further including a surface disposed rearwardly from said sharpened forward edge;

a claw mounted on said distal-end of said shaft, said claw having two spaced pivot arms pivotably mounted on transversely opposite sides of a pivot location on said shaft, said pivot arms each having a forward section extending generally forward from said pivot location and a rear section extending generally rearward from said pivot location to permit said claw to pivot relative to said cutting blade surface between open and closed positions, said claw further including a serrated leading edge member extending transversely between said forward sections of said two spaced pivot arms, said serrated leading edge being spaced from said cutting blade surface in said open position of said claw and in abutting contact with said cutting blade surface in said closed position of said claw;

a handle secured to the proximal end of said shaft;

a manually actuable member secured to said handle;

connecting means extending between said rear sections of said two spaced pivot arms;

a linkage rod having a first end secured to said connecting means and a second end secured to said member for selectively pivoting said claw between said open and closed positions in response to manual actuation of said member; and bias means for exerting a continuous bias force on said member and said rod to maintain said claw in said open position in the absence of manual actuation of said member.

2. The tool of claim 1 wherein said manually actuable member is a trigger pivotably mounted on said handle.

3. The tool of claim 2 wherein said handle is a pistol grip.

4. The tool of claim 1 wherein said cutting blade is narrower at said forward edge than the width of said serrated leading edge of said claw, and wherein said cutting blade becomes wider at a location rearwardly of said forward edge to provide said cutting blade surface with a width at least commensurate with the width of said serrated leading edge of said claw.

5. The tool of claim 4 wherein said sharpened forward edge of said cutting blade is a generally V-shaped notch.

6. A lawn and garden tool for removing weeds and dandelions, said tool comprising:

a support shaft having proximal and distal ends;

a cutting blade fixedly mounted on the distal end of said shaft, said cutting blade having a sharpened forward edge for penetrating soil and severing roots of dandelions and weeds to be removed, said blade further including a surface disposed rearwardly from said sharpened forward edge;

a claw mounted on said distal end of said shaft, said claw having a serrated leading edge supported by two spaced pivot arms pivotably mounted on opposite sides of said shaft to permit said claw to pivot relative to said cutting blade surface between open and closed positions, said serrated leading edge being spaced from said cutting blade surface in said open position of said claw, said serrated edge being in abutting contact with said cutting blade surface in said closed position of said claw;

a handle secured to the proximal end of said shaft;

a manually actuable member secured to said handle;

a linkage rod having a first end secured to said claw and a second end secured to said member for selectively pivoting said claw between said open and closed positions in response to manual actuation of said member; and bias means for exerting a continuous bias force on said member and said rod to maintain said claw in said open position in the absence of manual actuation of said member wherein said bias means comprises a spring compressibly recessed in said handle and secured to said manually actuable member.

7. The tool of claim 6 wherein said manually actuable member is a trigger pivotably mounted on said handle.

8. The tool of claim 7 wherein said handle is a pistol grip.

9. The tool of claim 6 wherein said cutting blade is narrower at said forward edge than the width of said serrated leading edge of said claw, and wherein said cutting blade becomes wider at a location rearwardly of said forward edge to provide said cutting blade surface with a width at least commensurate with the width of said serrated leading edge of said claw.

10. The tool of claim 9 wherein said sharpened forward edge of said cutting blade is a generally V-shaped notch.

11. A lawn and garden tool for removing weeds and dandelions, said tool comprising:

a shaft having proximal and distal ends;

a cutting blade fixedly mounted on the distal end of said shaft, said cutting blade having a sharpened forward edge for penetrating soil and severing roots of dandelions and weeds to be removed, said blade further including a surface disposed rearwardly of said forward edge;

a claw pivotably mounted on said distal end of said shaft to permit said claw to pivot between open and closed positions, said claw having a serrated leading edge spaced from said surface of said blade in said open position of said claw, said serrated edge being in abutting contact with said surface of said blade in said closed position of said claw;

a handle secured to the proximal end of said shaft;

a manually actuable member secured to said handle;

a linkage rod having a first end secured to said claw and a second end secured to said manually actuable member for selectively pivoting said claw in response to manual actuation of said member; and a bias spring compressively recessed in said handle and secured to said member for exerting a continuous bias force on said rod through said member to maintain said claw in said open position in the absence of manual actuation of said member.

12. The tool of claim 11 wherein said member is a trigger pivotably mounted on said handle.

13. The tool of claim 12 wherein said handle is a pistol grip,

14. The tool of claim 11 wherein said cutting blade is narrower at said forward edge than the width of said serrated leading edge of said claw, and wherein said cutting blade becomes wider at a location rearwardly of said forward edge to provide said cutting blade surface with a width at least commensurate with the width of said serrated leading edge of said claw.

15. The tool of claim 14 wherein said sharpened forward edge of said cutting blade is a generally V-shaped notch.

* * * * *